(12) United States Patent
Kubo et al.

(10) Patent No.: US 8,009,537 B2
(45) Date of Patent: Aug. 30, 2011

(54) DISK INSPECTION APPARATUS

(75) Inventors: Mitsumasa Kubo, Tokyo (JP); Tsuyoshi Oyamatasu, Tokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 0 days.

(21) Appl. No.: 12/749,189

(22) Filed: Mar. 29, 2010

(65) Prior Publication Data

US 2010/0329093 A1    Dec. 30, 2010

(30) Foreign Application Priority Data

Jun. 29, 2009  (JP) .................. 2009-153648

(51) Int. Cl.
   *G11B 20/18*    (2006.01)
(52) U.S. Cl. .................. 369/53.12; 369/44.32
(58) Field of Classification Search ............... 369/44.32, 369/53.12, 53.13, 53.15, 53.17
   See application file for complete search history.

(56) References Cited

U.S. PATENT DOCUMENTS

2010/0329093 A1* 12/2010 Kubo et al. ............. 369/53.12

FOREIGN PATENT DOCUMENTS

| JP | 10134527 A | 5/1998 |
| JP | 3093865 U | 2/2003 |
| JP | 2004330375 A | 11/2004 |

* cited by examiner

*Primary Examiner* — Wayne Young
*Assistant Examiner* — Brenda Bernardi
(74) *Attorney, Agent, or Firm* — Seed IP Law Group PLLC (57) ABSTRACT

A disk inspection apparatus for discriminating disks. The disk inspection apparatus has an ECC control section and a comparison section. The ECC control section measures the number of error corrections PIE and the number of error correction failures PIF in a predetermined section of the disk. The comparison section discriminates the disk as a disk with a deterioration in jitter characteristic when the minimum or the average of the PIE exceeds a first threshold value; discriminates the disk as a normal disk when the maximum of the PIF is equal to or smaller than a second threshold and the minimum or the average of the PIE is equal to or smaller than the first threshold value; and discriminates the disk as a scratched disk when the minimum or the average of the PIE is equal to or smaller than the first threshold value and the maximum of the PIF exceeds the second threshold value.

8 Claims, 6 Drawing Sheets

FIG. 11 too long described below is illustrative only and the scope of the present invention is not limited to the embodiment.

DETAILED DESCRIPTION

An embodiment of the present invention will be described with reference to the drawings with respect to inspection of an optical disk by way of example.

Figure 1:
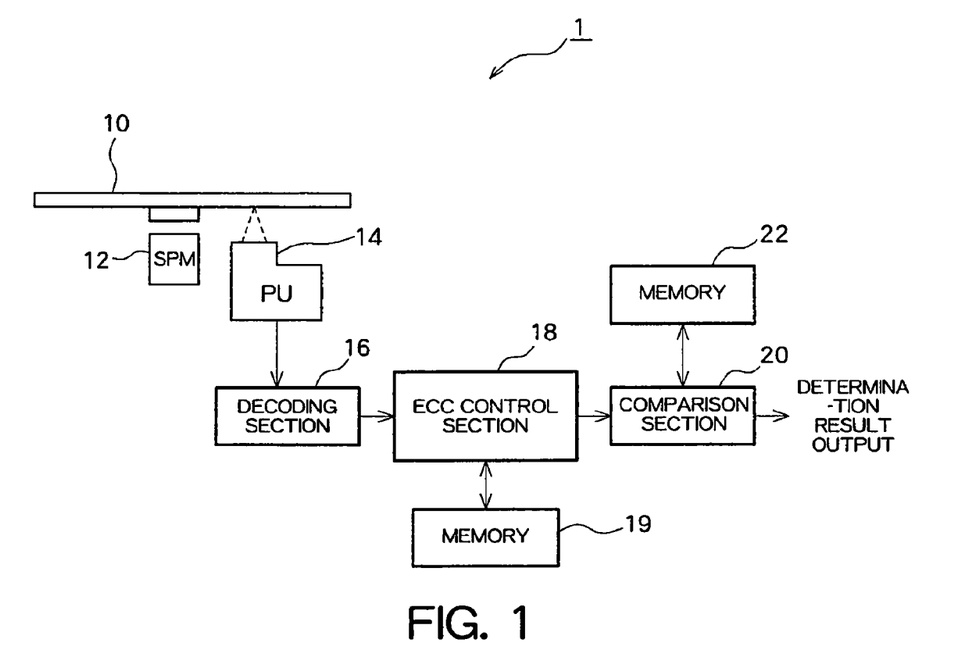
FIG. 1 is a constitutional block diagram of an embodiment.

FIG. 1 shows a constitutional block diagram of a disk inspection apparatus 1 according to an embodiment of the present invention. A disk 10 to be inspected, such as a CD or a DVD is set in a disk tray and is rotationally driven by a spindle motor (SPM) 12.

A pickup (PU) 14 has an objective lens which condenses on a recording surface of the disk 10 laser light emitted from a semiconductor laser, and a photodetector which receives light reflected from the disk 10 and converts the light into an electrical signal. The pickup (PU) 14 applies laser light of reproduction power to the disk 10, receives the light reflected from the disk 10, and takes out the light as a reproduction signal. The pickup (PU) 14 has a focus servo and a tracking servo, which are well known per se. It is also well known that the pickup (PU) 14 is driven in a radial direction of the disk 10 by a thread motor constituted by a stepping motor. The pickup (PU) 14 supplies the reproduction signal read out from the disk 10 to a decoding section 16.

The decoding section 16 binarizes and demodulates the reproduction signal and supplies the demodulated reproduction signal to an error check and correction (ECC) control section 18. A focus error signal and a tracking error signal produced from the reproduction signal are respectively supplied to a focus servo section and a tracking servo section, while an address signal contained in the reproduction signal is supplied to an address detection section.

The ECC control section 18 executes error correction processing on data demodulated in the decoding section 16. The error correction processing is error correction using a Reed-Solomon code. The demodulated data are corrected on an ECC block basis. Each of the ECC blocks is a product code between an inner code (PI) sequence and an outer code (PO) sequence and has a parity added thereto. The ECC control section 18 reads out the demodulated data with respect to each PI sequence and corrects the demodulated data by detecting an error byte from the demodulated data. The ECC control section 18 counts the number of error corrections made (hereinafter referred to as "PIE" (parity inner errors)) and the number of errors that have been uncorrectable (hereinafter referred to as "PIF" (parity inner failures)). and stores the numbers in a memory 19. After completing processing on all PI sequences, the ECC control section 18 proceeds to processing on PO sequences. The ECC control section 18 executes error correction processing as described above with respect to an arbitrary one of tracks in the disk 10, counts the PIE and the PIF with respect to each ECC block, and stores the numbers of PIE and PIF one after another in the memory 19. The ECC control section 18 then computes the minimum or the average of the PIE in a plurality of ECC blocks, computes the maximum of the PIF in the plurality of ECC blocks, and supplies these values to a comparison section 20. The plurality of ECC blocks may be, for example, 16 blocks.

The comparison section 20 compares the minimum or average of the PIE and the maximum of the PIF from the ECC control section 18 respectively with predetermined threshold values in the magnitude relationships therebetween. The two threshold values are stored in a memory 22 in advance. The comparison section 20 determines whether the disk to be inspected 10 is a scratched disk, a disk with a deterioration in jitter characteristic as a result of polishing, or a normal disk according to the result of comparison between the minimum or average of the PIE and the threshold value and the result of comparison between the maximum of the PIF and the threshold value, and outputs a determination result.

The determination result from the comparison section 20 is displayed, for example, on a display (not shown) to notify a user who handles the disk 10. Also, the determination result may be supplied to a loader to enable the loader to automatically sort the disk 10 according to the determination result.

Figure 2:
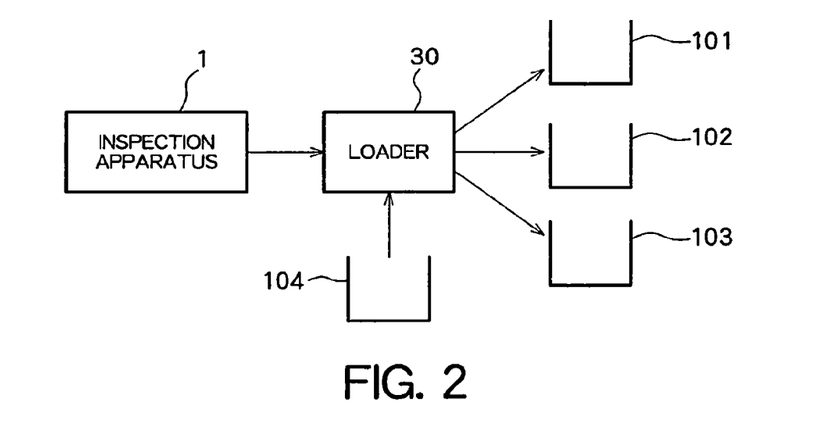
FIG. 2 is another constitutional block diagram of the embodiment.

FIG. 2 is a constitutional block diagram of a disk inspection apparatus having a function to automatically sort disks according to determination results.

The determination result from the disk inspection apparatus 1 shown in FIG. 1 is supplied to a loader 30. The loader 30 has a rotating shaft which rotates about a vertical axis, for example, and a holding arm provided on the shaft; takes out the disk 10 to be inspected set in the disk tray according to the determination result; transports the disk 10; and houses the disk 10 in one of stockers 101, 102, and 103. The stocker 101 is a stocker for normal disks. The stocker 102 is a stocker for scratched disks. The stocker 103 is a stocker for disks with deteriorations in jitter characteristic due to excessive polishing. After taking out the disk 10 from the disk tray and housing the disk 10 in one of the stockers 101 to 103, the loader 30 newly takes out another disk 10 from a stocker 104 containing disks ready to be inspected and sets this disk 10 in the disk tray. The disk inspection apparatus 1 inspects the newly set disk 10, and supplies the determination result to the loader 30.

By the above-described processing, a substantially large number of disks 10 can be sorted in a short time period. For example, in a rental shop, disks 10 sorted and stocked in the stocker 101 are exposed as is for sale; disks 10 sorted and stocked in the stocker 102 are exposed after being polished with a special-purpose polisher; and disks 10 sorted and stocked in the stocker 103 are discarded.

A polisher for polishing disks 10 sorted and stocked in the stocker 102 may be incorporated. The loader 30 takes out the disks 10 sorted and stocked in the stocker 102 one after another to supply the disks 10 to a polisher. The polisher polishes the surfaces of the disks to remove scratches. The loader 30 houses the polished disks 10 in the stocker 101. Needless to say, each polished disk 10 may be transported to the disk inspection apparatus 1 to be inspected again. If the disk 10 is determined to be normal by reinspection after polishing, the loader 30 houses the disk 10 in the stocker 101.

Figure 3:
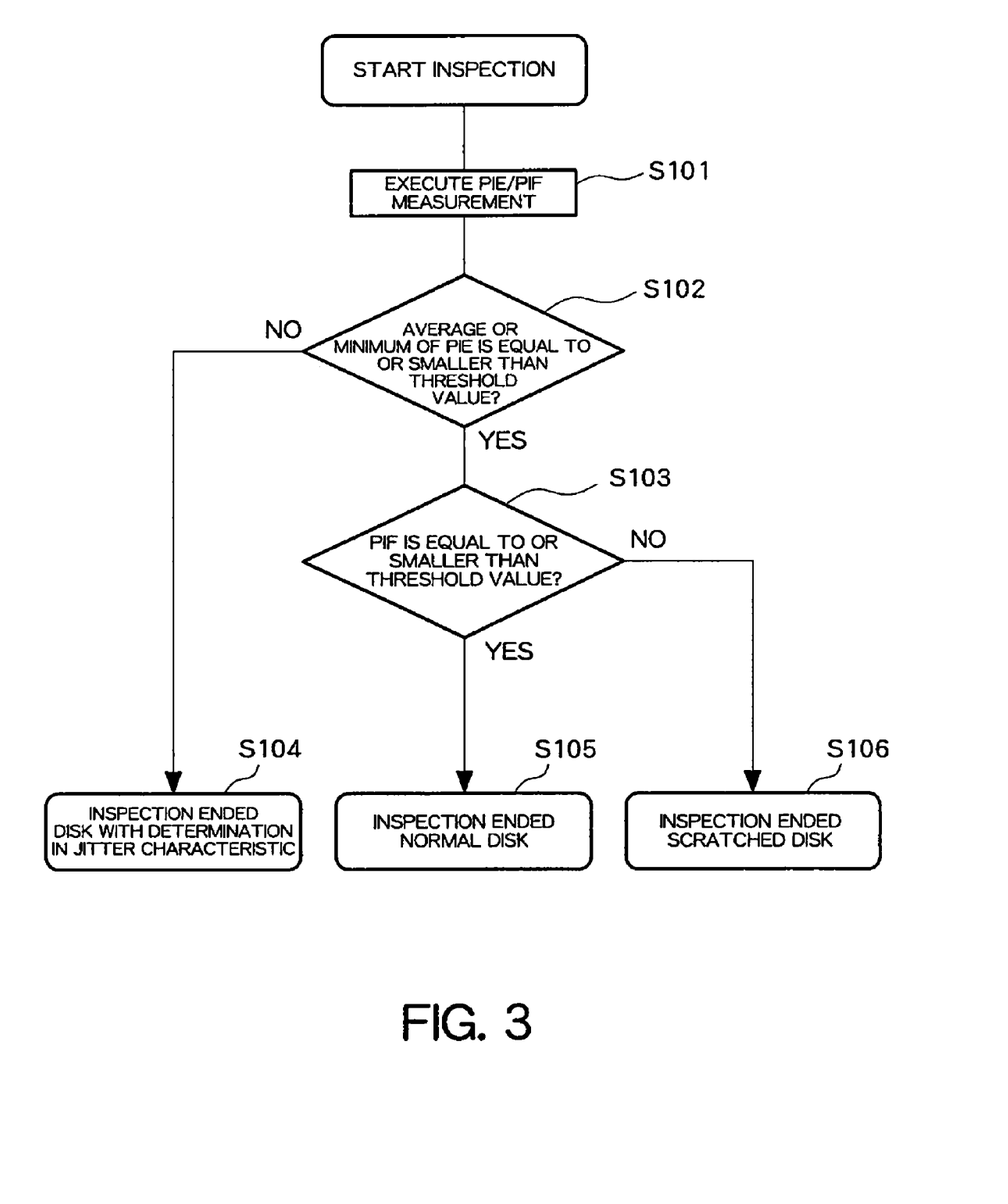
FIG. 3 is a flowchart of processing in the embodiment.

FIG. 3 shows a flowchart of inspection processing in the disk inspection apparatus 1. The disk 10 to be inspected is set in the disk tray, data are reproduced from an arbitrary one of the tracks with the pickup 14, and the PIE and the PIF are measured by the ECC control section 18 (S101).

After measurement of the PIE and the PIF, the comparison section 20 compares the minimum or average of the PIE with the predetermined threshold value in the magnitude relationship therebetween (S102). For example, the comparison section 20 compares the minimum of the PIE in 16 ECC blocks with the predetermined threshold value. The PIE is the number of error corrections in the PI sequence, as described above. If the thickness of the disk substrate is reduced by polishing the disk 10, a spherical aberration is correspondingly produced and causes a deterioration in jitter characteristic of the reproduction signal. With the deterioration in jitter characteristic, the possibility of occurrence of errors is increased, so that the PIE is increased. That is, the PIE can function as an index indicating the extent to which the disk 10 has been polished. Accordingly, if the result of comparison between the minimum of the PIE and the predetermined threshold value in the magnitude relationship therebetween is that the minimum of the PIE is not equal to or smaller than the threshold value; that is, the PIE is larger than the threshold value, the comparison section 20 determines the disk 10 as a disk with a deterioration in jitter characteristic due to polishing (S104). If the minimum of the PIE is equal to or smaller than the threshold value, the comparison section 20 compares the maximum of the PIF with the threshold value in the magnitude relationship therebetween (S103). The PIF is the number of error correction failures with respect to the PI sequence, as described above. If the disk 10 has a scratch, the possibility of error correction failure is high, so that the PIF is increased. That is, the PIF can function as an index indicating the degree of seriousness of a scratch on the disk 10. Accordingly, if the result of comparison between the maximum of the PIF and the predetermined threshold value in the magnitude relationship therebetween is that the maximum of the PIF is equal to or smaller than the predetermined threshold value, the comparison section 20 determines the disk 10 to be a normal disk (S105). If the maximum of the PIF is larger than the predetermined threshold value, the comparison section 20 determines the disk 10 to be a scratched disk (S106).

As described above, the disk inspection apparatus 1 discriminates the disk to be inspected 10 as one of three types: a normal disk, a scratched disk, and a disk with a deterioration in jitter characteristic. Scratches on a scratched disk can be removed by polishing with a polisher. With respect to a disk with a deterioration in jitter characteristic, further polishing the disk is meaningless, because polishing has already been excessively performed thereon and, therefore, polishing of the disk is not performed.

Figure 4:
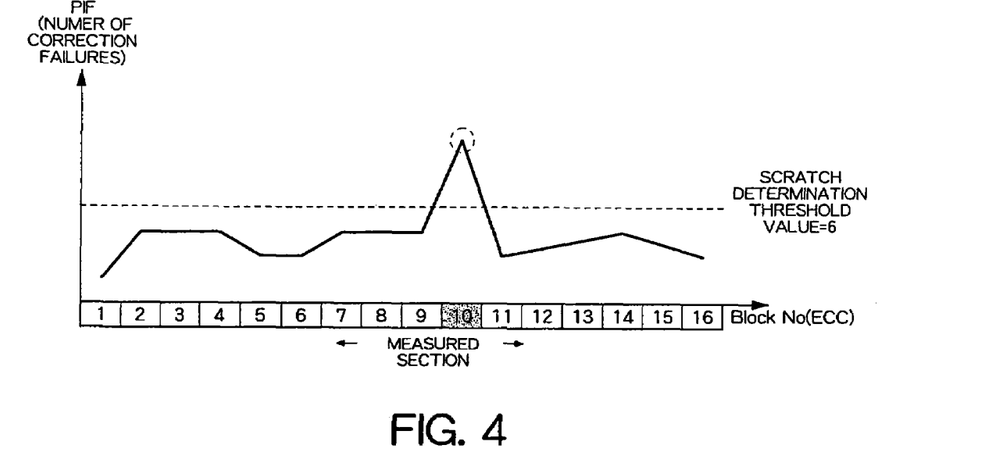
FIG. 4 is, a diagram showing PIF measurement.

FIG. 4 shows an example of the PIF computed with respect to a plurality of ECC blocks (a total of 16 blocks). With respect to a measured section shown in FIG. 4, a scratch exists at a disk position corresponding to the ECC block indicated by block number 10. At this position, therefore, the maximum of the PIF is exhibited and this maximum exceeds the predetermined threshold value (the scratch determination threshold value in FIG. 4).

Figure 5:
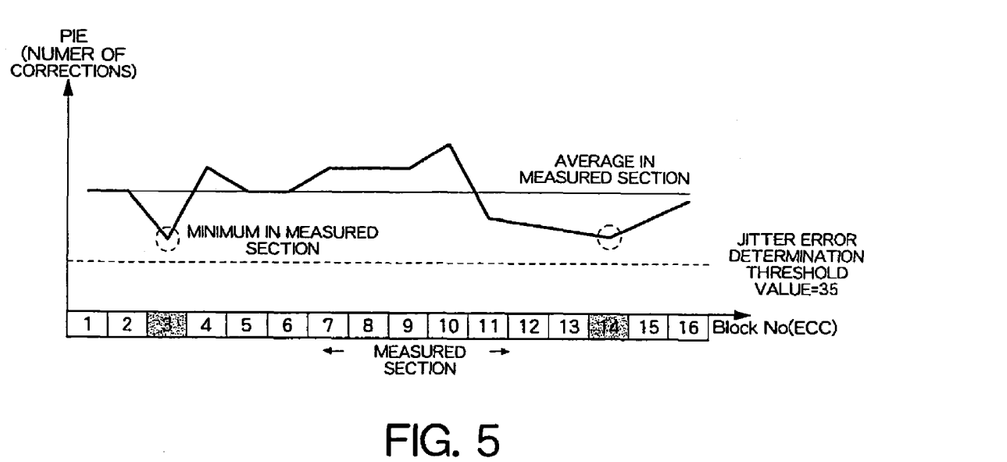
FIG. 5 is a diagram showing PIE measurement.

FIG. 5 shows an example of the PIE computed with respect to a plurality of ECC blocks (a total of 16 blocks). With respect to a measured section shown in FIG. 5, the minimum of the PIE exceeds the predetermined threshold value (the jitter error determination threshold value in FIG. 5) at ECC blocks indicated by block numbers 3 and 14. FIG. 5 also shows the average of the PIE through the 16 ECC blocks. The average also exceeds the threshold value. The threshold value with which the minimum of the PIE is to be compared and the threshold value with which the average of the PIE is to be compared may be different from each other.

Figure 6:
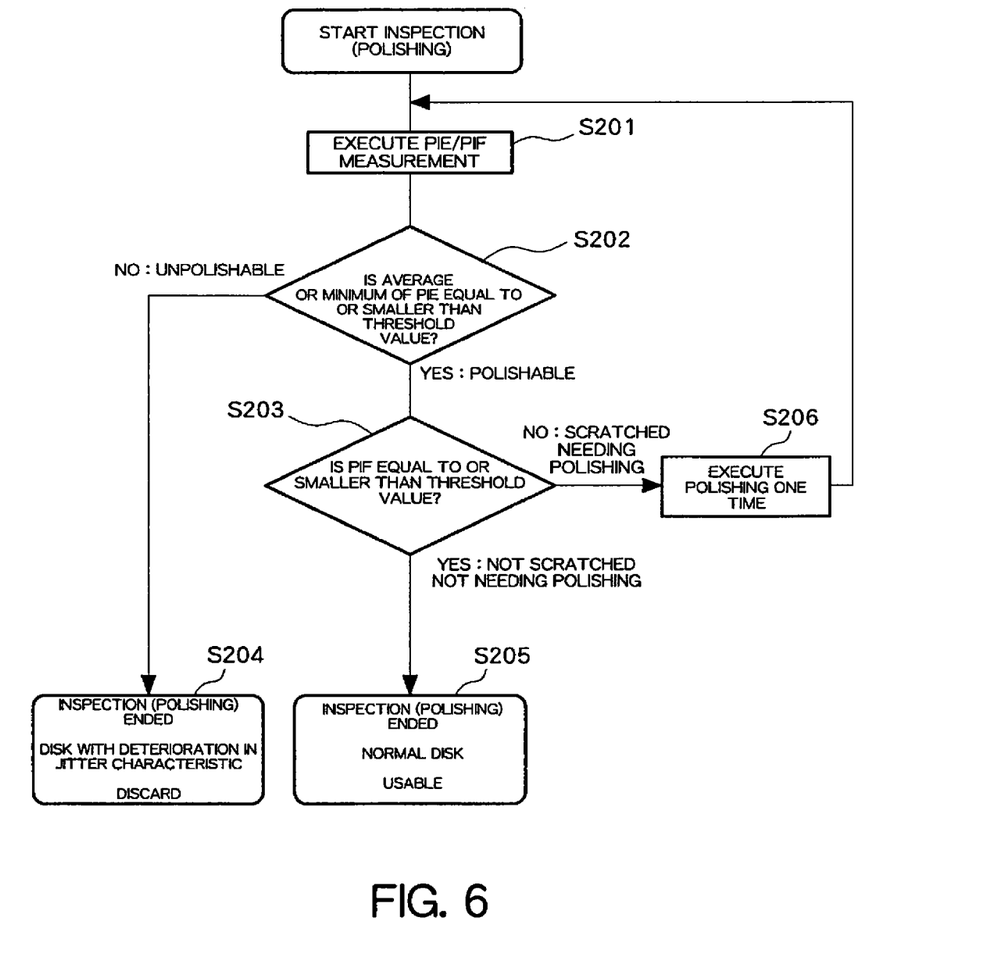
FIG. 6 is another flowchart of processing in the embodiment.

FIG. 6 shows another flowchart of inspection processing in the disk inspection apparatus 1. First, the ECC control section 18 measures the PIE and the PIF (S201). Next, the comparison section 20 compares the minimum or average of the PIE with the threshold value in the magnitude relationship therebetween (S202). For example, the comparison section 20 compares the minimum of the PIE with the threshold value. If the minimum of the PIE exceeds the threshold value, the comparison section 20 determines the disk to be inspected 10 to be a disk with a deterioration in jitter characteristic incapable of being polished (S204).

If the minimum of the PIE is equal to or smaller than the threshold value, the comparison section 20 determines the disk 10 to be a disk basically capable of being polished, and further compares the maximum of the PIF with the threshold value in the magnitude relationship therebetween (S203). If the maximum of the PIF is equal to or smaller than the threshold value, the comparison section 20 determines the disk to be inspected 10 to be a normal disk, and the disk is reused without being polished (S205). If the maximum of the PIF exceeds the threshold value, the comparison section 20 determines that the disk has a scratch and needs polishing, and polishing of the disk with a polisher is executed one time (S206). Processing in S201 and the other subsequent steps is repeated after polishing. If the minimum or average of the PIE is equal to or smaller than the threshold value, and if the maximum of the PIF is also equal to or smaller than the threshold value, the disk is determined to be a normal disk. If the maximum of the PIF exceeds the threshold value while the minimum or average of the PIE is equal to or smaller than the threshold value, polishing is again executed in S206 (second-time polishing). That is, polishing is repeatedly executed until the maximum of the PIF becomes equal to or smaller than the threshold value.

As the disk 10 is polished, the PIF decreases, because the depth of scratches is reduced (scratches are erased). However, if there are scratches having an excessively large depth exceeding the allowable amount of polishing, the PIF does not change substantially. As the disk 10 is polished, the PIE increases. By excessive polishing, the PIE increases to be soon recognized as a jitter error. That is, in a case where the maximum of the PIF does not become equal to or smaller than the threshold value even after executing polishing in S206 a certain number of times in the process shown in the processing flowchart of FIG. 6, the minimum or average of the PIE soon exceeds the threshold value, and a result of NO is obtained in S202 and the disk is determined to be a disk with a deterioration in jitter characteristic.

Figure 7:
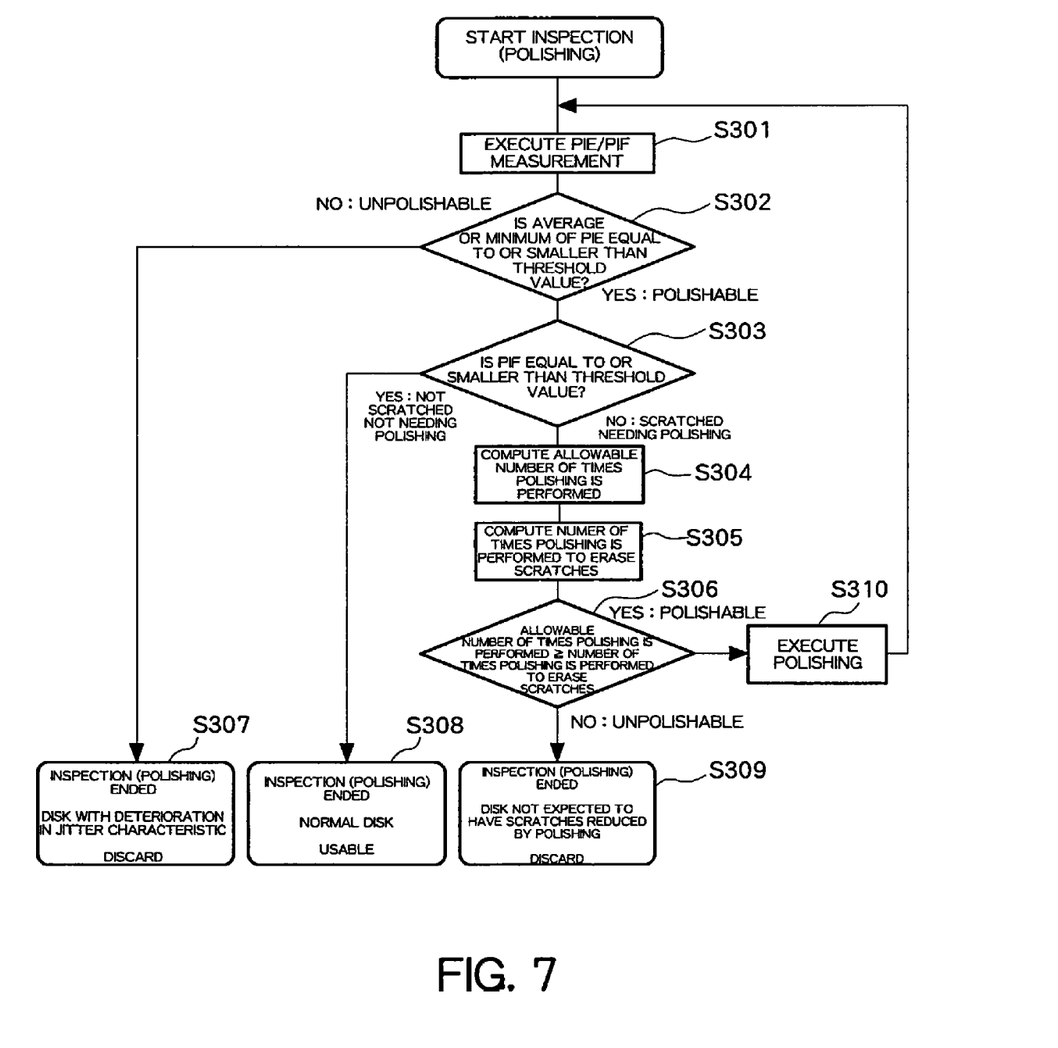
FIG. 7 is a still another flowchart of processing in the embodiment.

FIG. 7 shows still another flowchart of inspection processing in the disk inspection apparatus 1. First, the ECC control section 18 measures the PIE and the PIF (S301). Next, the comparison section 20 compares the minimum or average of the PIE with the threshold value in the magnitude relationship therebetween (S302). For example, the comparison section 20 compares the minimum of the PIE with the threshold value. If the minimum of the PIE exceeds the threshold value, the comparison section 20 determines the disk to be inspected 10 to be a disk with a deterioration in jitter characteristic incapable of being polished (S307).

If the minimum or average of the PIE is equal to or smaller than the threshold value, the comparison section 20 determines the disk 10 to be a disk basically capable of being polished, and further compares the maximum of the PIF with the threshold value in the magnitude relationship therebetween (S303). If the maximum of the PIF is equal to or smaller than the threshold value, the comparison section 20 determines the disk to be inspected 10 to be a normal disk (S308). If the maximum of the PIF exceeds the threshold value, a computation section in the comparison section 20 computes the allowable number of times polishing is performed (S304) and computes the number of times polishing is to be performed to erase scratches (S305).

Description will be made of the allowable number of times polishing is performed and the number of times polishing is to be performed to erase scratches.

The number of times polishing is to be performed to erase scratches is the number of executions of polishing required to reduce the PIF to a value equal to or smaller than the threshold value. The number of times polishing is to be performed is computed by actually measuring the relationship between polishing one time and the reduction in the PIF with respect to a plurality of disks provided as a sample. In general, the polishing depth in polishing one time is changed along the disk radial direction, and the change in polishing depth along the disk radial direction depends on a characteristic of a polisher. The reduction in the PIF also varies depending on the present PIF value. That is, the reduction in the PIF by polishing one time is ordinarily specified as a function of the disk radial position and the present PIF value.

Figure 8:
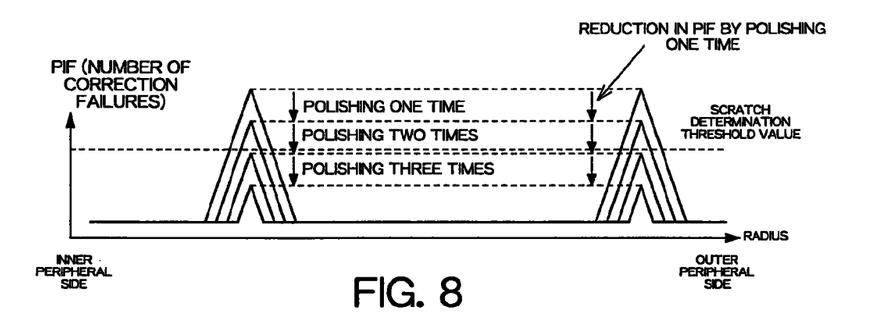
FIG. 8 is a diagram showing changes in PIF in a case where polishing is uniformly performed between inner and outer peripheral sides of a disk.

FIG. 8 shows changes in the PIF accompanying polishing in a case where the disk 10 is uniformly polished between the inner and outer peripheral sides. With the progress of polishing: first polishing, second polishing, and third polishing, the PIF decreases at generally the same rates of decrease at the inner and outer peripheral sides. If the PIF becomes equal to or smaller than the threshold value as a result of polishing two times, the number of times polishing is to be performed to erase scratches is two.

Figure 9:
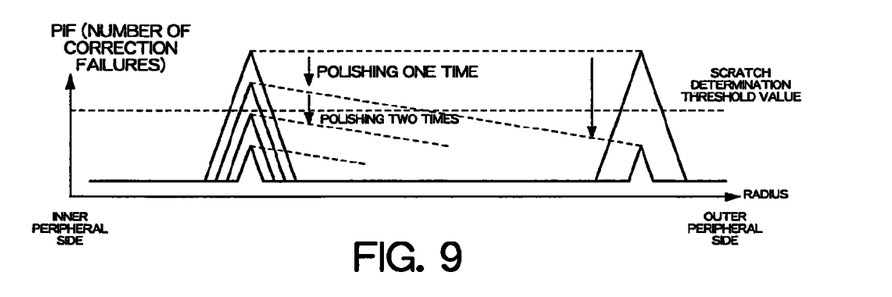
FIG. 9 is a diagram showing changes in PIF in a case where the depth of polishing is greater at the outer peripheral side than at the inner peripheral side.

FIG. 9 shows changes in the PIF accompanying polishing in a case where the disk 10 is polished more deeply at the outer peripheral side than at the inner peripheral side. With the progress of polishing: first polishing, second polishing, and third polishing, the PIF decreases. However, the rate of decrease at the outer peripheral side is higher than that at the inner peripheral side. The PIF becomes equal to or smaller than the threshold value as a result of polishing one time at the outer peripheral side, while the PIF becomes equal to or smaller than the threshold value as a result of polishing two times at the inner peripheral side. Since there is a need to make the disk 10 capable of reproduction at both the inner and outer peripheral sides, the number of times polishing is to be performed to erase scratches in this case is two. The number of times polishing is to be performed to erase scratches may be computed by inputting the PIF to the function with respect to each position in the disk radial direction. The maximum of the numbers of times thus computed may be set as the number of times polishing is to be performed to erase scratches.

The allowable number of times polishing is performed is the number of times at which the minimum or average of the PIE does not exceed the threshold value. The allowable number of times polishing is performed is computed by actually measuring the relationship between polishing one time and the increase in the PIE with respect to a plurality of disks provided as a sample. The change in polishing depth along the disk radial direction in polishing one time depends on a characteristic of a polisher, and the increase in the PIE also varies depending on the present PIE value, as in the case of the PIF. That is, the increase in the PIE by polishing one time is specified as a function of the disk radial position and the present PIE value.

Figure 10:
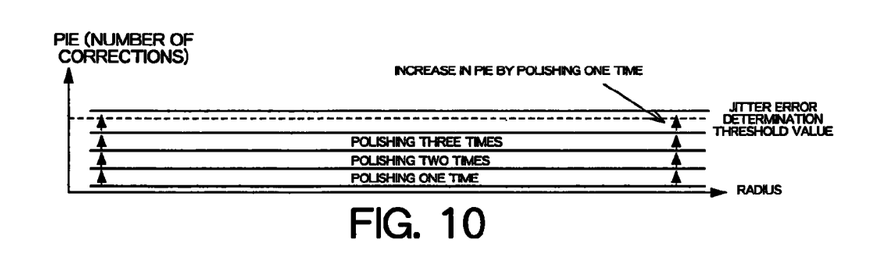
FIG. 10 is a diagram showing changes in PIE in the case where polishing is uniformly performed between the inner and outer peripheral sides.

FIG. 10 shows changes in the PIE accompanying polishing in a case where the disk 10 is uniformly polished between the inner and outer peripheral sides. With the progress of polishing: first polishing, second polishing, and third polishing, the PIE increases at generally the same rates of increase at the inner and outer peripheral sides. If the PIE exceeds the threshold value as a result of polishing four times, the allowable number of times polishing is performed is three.

Figure 11:
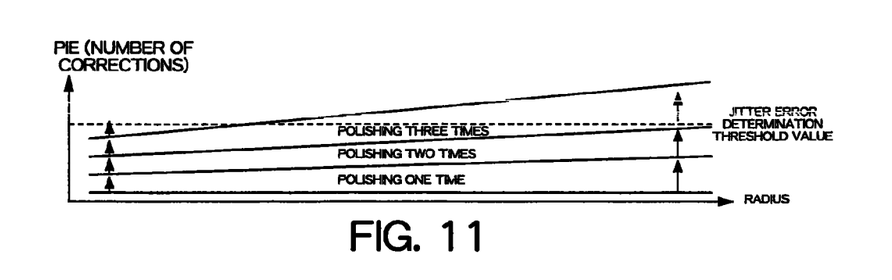
FIG. 11 is a diagram showing changes in PIE in the case where the depth of polishing is greater at the outer peripheral side than at the inner peripheral side.

FIG. 11 shows changes in the PIE accompanying polishing in a case where the disk 10 is polished more deeply at the outer peripheral side than at the inner peripheral side. With the progress of polishing: first polishing, second polishing, and third polishing, the PIE increases. However, the rate of increase at the outer peripheral side is higher than that at the inner peripheral side. The PIE exceeds the threshold value as a result of polishing four times at the outer peripheral side, while the PIE is still equal to or smaller than the threshold value as a result of polishing four times at the inner peripheral side. Since there is a need to make the disk 10 capable of reproduction at both the inner and outer peripheral sides, the allowable number of times polishing is performed is three. The allowable number of times polishing is performed may be computed by inputting the PIE to the function with respect to each position in the disk radial direction. The minimum of the numbers of times thus computed may be set as the allowable number of times polishing is performed.

Referring again to FIG. 7, after computing the allowable number of times polishing is performed and the number of times polishing is to be performed to erase scratches as described above, the allowable number of times polishing is performed and the number of times polishing is to be performed to erase scratches are compared in the magnitude relationship therebetween in the comparison section 20 (S306). If (the allowable number of times polishing is performed)<(the number of times polishing is to be performed to erase scratches), the disk is determined to be a disk not expected to have scratches reduced by polishing (S309). If (the allowable number of times polishing is performed) (the number of times polishing is to be performed to erase scratches), this condition means that the disk can be polished and can have scratches erased by polishing and, therefore, polishing is executed (S310). However, this polishing is executed a number of times equal to or smaller than the number of times polishing is to be performed to erase scratches.

In the present embodiment, as described above, the two physical quantities PIE and PIF are used and respectively compared with the threshold values in the magnitude relationship therebetween, thereby enabling the inspected disk 10 to be discriminated as a normal disk, a scratched disk which needs polishing, or a disk with a deterioration in jitter characteristic and incapable of being polished.

In the present embodiment, it is desirable to perform inspection basically through the entire periphery between the inner and outer peripheral sides of the disk 10. However, it may be the case that inspection is performed only on one to several tracks at the inner peripheral side, one to several tracks at an intermediate position between the inner and outer peripheral sides, and one to several tracks at the outer peripheral side. For example, data in one track at the inner peripheral side are reproduced, the PIE and the PIF therein are measured, and determinations are made with respect to the PIE and the PIF. Subsequently, data in one track at an intermediate position between the inner and outer peripheral sides are reproduced, the PIE and the PIF therein are measured, and determinations are made with respect to the PIE and the PIF. As shown in the processing in FIG. 7, data may be reproduced at a time from tracks to be inspected and the PIE and the PIF therein measured, followed by determination on the basis of the data.

Also, since in ordinary cases the disk is polished more deeply at the outer, peripheral side than at the inner peripheral side, inspection of the disk 10 may be executed from the outer peripheral side to the inner peripheral side instead of being executed from the inner peripheral side to the outer peripheral side.

In the present embodiment, the PIE and the PIF are measured in correspondence with a plurality of ECC blocks (a total of 16 ECC blocks). However, the present invention is not limited to this. The PIE and the PIF may be measured in correspondence with a plurality of ECC blocks or a predetermined number of ECC blocks and determinations may be made with respect to the PIE and the PIF. In short, discrimination of the disk as one of a normal disk, a scratched disk, and a disk with a deterioration in jitter characteristic may be made on the basis of the PIE and the PIF in a predetermined section to output the discrimination result.

Also, although in the present embodiment the disk 10 is discriminated as one of a normal disk, a scratched disk, and a disk with a deterioration in jitter characteristic, the description of the embodiment may be reread by replacing "a scratched disk" with "a polishable disk (restorable by polishing)" and replacing "a disk with a deterioration in jitter characteristic" with "an unpolishable disk (which has already been polished excessively and for which performing further polishing is meaningless)", and the disk 10 may be discriminated as one of a normal disk, a polishable disk, and an unpolishable disk.

What is claimed is:

1. A disk inspection apparatus, comprising:
    means for detecting the number of error corrections PIE and the number of error correction failures PIF in a predetermined section of data reproduced from a disk;
    means for discriminating the disk at least as a normal disk, a scratched disk, or a disk with a deterioration in jitter characteristic by comparing the number of error corrections PIE and the number of error correction failures PIF respectively with predetermined threshold values in the magnitude relationship therebetween; and
    means for outputting a discrimination result.

2. The apparatus according to claim 1, wherein the discriminating means discriminates the disk by comparing the minimum or the average of the number of error corrections PIE in the predetermined section with a first threshold value, and comparing the maximum of the number of error correction failures PIF with a second threshold value in the magnitude relationship therebetween.

3. The apparatus according to claim 2, wherein the discriminating means discriminates the disk as a disk with a deterioration in jitter characteristic or as an unpolishable disk when the minimum or the average of the number of error corrections PIE exceeds the first threshold value; discriminates the disk as a normal disk when the maximum of the number of error correction failures PIF is equal to or smaller than the second threshold value and the minimum or the average of the number of error corrections PIE is equal to or smaller than the first threshold value; and discriminates the disk as a scratched disk or a polishable disk when the minimum or the average of the number of error corrections PIE is equal to or smaller than the first threshold value and the maximum of the number of error correction failures PIF exceeds the second threshold value.

4. The apparatus according to claim 1, further comprising a loader which sorts the disk by stocking the disk in one of a plurality of stockers according to the output discrimination result.

5. A disk inspection apparatus, comprising:
    means for detecting the number of error corrections PIE and the number of error correction failures PIF in a predetermined section of data reproduced from a disk;
    means for discriminating the disk at least as a normal disk, a polishable disk, or an unpolishable (disk by comparing the number of error corrections PIE and the number of error correction failures PIF with a first threshold value and a second threshold value, respectively, in the magnitude relationship therebetween; and
    means for outputting a discrimination result.

6. The apparatus according to claim 5, wherein the discriminating means discriminates the disk by comparing the minimum or the average of the number of error corrections PIE in the predetermined section with the first threshold value, and comparing the maximum of the number of error correction failures PIF with the second threshold value in the magnitude relationship therebetween.

7. The apparatus according to claim 6, wherein the discriminating means discriminates the disk as a disk with a deterioration in jitter characteristic or as an unpolishable disk when the minimum or the average of the number of error corrections PIE exceeds the first threshold value; discriminates the disk as a normal disk when the maximum of the number of error correction failures PIF is equal to or smaller than the second threshold value and the minimum or the average of the number of error corrections PIE is equal to or smaller than the first threshold value; and discriminates the disk as a scratched disk or a polishable disk when the minimum or the average of the number of error corrections PIE is equal to or smaller than the first threshold value and the maximum of the number of error correction failures PIF exceeds the second threshold value.

8. The apparatus according to claim 5, further comprising a loader which sorts the disk by stocking the disk in one of a plurality of stockers according to the output discrimination result.

* * * * *

UNITED STATES PATENT AND TRADEMARK OFFICE
CERTIFICATE OF CORRECTION

| | | |
|---|---|---|
| PATENT NO. | : 8,009,537 B2 | |
| APPLICATION NO. | : 12/749189 | |
| DATED | : August 30, 2011 | |
| INVENTOR(S) | : Mitsumasa Kubo et al. | |

It is certified that error appears in the above-identified patent and that said Letters Patent is hereby corrected as shown below:

Column 10, Line 25:
"a polishable disk, or an unpolishable (disk by comparing" should read as, --a polishable disk, or an unpolishable disk by comparing--.

Signed and Sealed this
Eleventh Day of October, 2011

David J. Kappos
*Director of the United States Patent and Trademark Office*